United States Patent [19]

Sato

[11] Patent Number: 4,925,715

[45] Date of Patent: May 15, 1990

[54] LINERLESS ROLL OF SELF FUSING TAPE

[75] Inventor: Kyosaku Sato, Sarnia, Canada

[73] Assignee: Polysar Limited, Sarnia, Canada

[21] Appl. No.: 362,563

[22] Filed: Jun. 7, 1989

[51] Int. Cl.$^5$ ............................ B32B 7/06; B32B 7/12

[52] U.S. Cl. ........................................ 428/40; 428/98; 428/220; 428/517

[58] Field of Search ................... 428/40, 98, 220, 517; 525/240

[56] References Cited

U.S. PATENT DOCUMENTS 4,713,133 12/1987 Kent ..................................... 428/462

Primary Examiner—Alexander S. Thomas

Attorney, Agent, or Firm—Stevens, Davis, Miller & Mosher

[57] ABSTRACT

The present invention relates to a tension wound roll of tape. The tape does not contain a separate adhesive layer but will bond to itself after being elongated by at least 50 percent and wrapped in overlapping layers. The tape of the invention will not self fuse when in roll form. The present tape is prepared from a minor proportion of a thermoplastic polymer and a major proportion of elastomeric polymer, and further contains a minor amount of an anti-blocking agent. The tape may be used in a wide variety of applications, for example, to repair leaks in hoses or pipes.

9 Claims, No Drawings

LINERLESS ROLL OF SELF FUSING TAPE

FIELD OF THE INVENTION

This invention relates to a non-tacky tape which contains a fatty amide anti-blocking agent. In particular, the invention relates to the tape when in roll form.

BACKGROUND OF THE INVENTION

Tape having insufficient tack to self fuse in the relaxed state, but capable of fusing after being elongated by about 50 percent and wrapped into overlapping layers is described in U.S. Pat. No. 4,713,133. The tape is cosmetically desirable because it does not contain a separate layer of adhesive, or any tackifiers, and hence does not leave a gummy tackifier residue on surfaces to which it is applied. In addition, the tape exhibits superior performance characteristics in cold environments or upon being immersed in water, which characteristics are difficult or impossible to duplicate in tapes having a separate adhesive layer.

Heretobefore it has not been possible to provide the tape in a convenient, linerless, roll form. Firstly, if the tape is wound without tension, the resulting roll is prone to undesired unwinding (since the tape does not have sufficient tack to reliably self adhere in the relaxed state). Alternatively, if the tape is rolled under sufficient tension, segments of the tape will elongate and strongly self-adhere or fuse to the point where the roll cannot be conveniently unwound. This second problem can be readily solved by inserting a removable liner as a separator between overlapping tape layers. However, removal of the liner is somewhat tedious and hence the tape is considered to be inconvenient. Furthermore, the liner causes an extra manufacturing cost and produces an undesirable waste that the final user must dispose of. Accordingly, a linerless roll of such tape would be a useful addition to the art.

It has not been surprisingly discovered that a convenient, linerless roll of tension wound, non-tacky tape can be prepared when the diameter of the roll is less than 12 cm and when the tape contains an effective amount of a fatty amide anti-blocking agent.

SUMMARY OF THE INVENTION

The present invention provides a tension-wound, linerless roll of tape, said tape having an unstretched thickness of from 0.1 to 2.0 mm and having insufficient tack to self-bond in the relaxed state and being capable of fusing into a homogeneous mass when elongated by at least about 50 percent and wrapped into overlapping layers, wherein said tape comprises:

(I) a polymer mixture selected from the group consisting of (all parts being parts by weight) (a) a mixture of from about 15 to about 30 parts of a polymer of ethylene having a density of from about 0.945 to about 0.965 grams/cm$^3$ with from about 70 to about 85 parts of elastomeric polymer, (b) a mixture of from about 15 to about 30 parts of a linear low density polymer of ethylene having a density of from about 0.91 to about 0.94 grams/cm$^3$ with from about 70 to about 85 parts of elastomeric polymer, and (c) a mixture of from about 15 to about 25 parts of isotactic polypropylene with from about 75 to about 85 parts of elastomeric polymer, said elastomeric polymer consisting of from about 50 to 100 parts by weight of an isobutylene-isoprene polymer and from 0 to about 50 parts by weight of one or more polymers selected from (i) natural rubber, (ii) a homopolymer of isobutylene having a molecular weight from about 50,000 to about 100,000, and (iii) a polymer of ethylene and propylene containing from about 50 to about 65 percent by weight ethylene, and (II) from 0.4 to 4 parts (per 100 parts of said polymer mixture) of fatty amide anti-blocking agent, said roll of tape having a diameter of less than 12 cm.

DETAILED DESCRIPTION OF THE INVENTION

The isobutylene-isoprene polymer (also referred to as "butyl rubber") may be selected from a polymer containing from about 97 to about 99.5 weight percent of isobutylene and from about 0.5 to about 3 weight percent of isoprene or from a polymer containing from about 0.5 to about 1.5 weight percent of chlorine or from about 1.5 to about 2.5 weight percent of bromine and from about 95 to about 99 weight percent of isobutylene and from about 0.5 to about 3 weight percent of isoprene. Such polymers are commercially available and have a molecular weight, expressed as the Mooney viscosity, of from about 30 to about 80 (ML 1+8 at 100° C).

Polyisobutylene elastomer is available commercially as various molecular weight products. It is prepared using Friedel-Crafts catalysts at low temperature and its manufacture is well known in the art. Polyisobutylene preferred in the raw polymer mixture has a Staudinger molecular weight of from about 50,000 to about 100,000 especially from about 60,000 to about 80,000. Grades having higher molecular weights, for example about 120,000 to about 135,000, result in very strong tapes which are difficult to stretch and which do not fuse satisfactorily at room temperature when stretched and wrapped. On the other hand, very low molecular weight grades result in tapes which are tacky and difficult to handle.

Elastomeric copolymers of ethylene and propylene are well known to those skilled in the art and a variety are available commercially. Suitable such copolymers include EPR (ethylene-propylene rubber) and EPDM (ethylene-propylene-terpolymer) containing by weight from about 50 percent to about 65 percent ethylene. The third monomer which is used in a small amount in the production of EPDM is a copolymerizable polyethylene. Those which are generally used commercially are non-conjugated dienes including 5-ethylidene-2-norbornene, 1,4-hexadiene and cyclic dienes such as dicyclopentadiene.

The natural rubber is preferably selected from the commercially available SMR grades.

Polyethylene is a well-known article of commerce and a large number of grades are available. The old or conventional grades are produced by a high pressure process which operates at a pressure of from about 15,000 to 50,000 psi. The polymers produced in this process contain a variety of short and long chain branches and have densities falling in the range from about 0.91 to 0.94 gm/cm$^3$. In the newer or low pressure processes, the polymer is produced either in gas phase fluidized bed reactors at pressures of about 100 to 300 psi or in liquid phase reactors. In these low pressure processes, the ethylene units polymerize in a linear fashion and randomly spaced short branches or side chains may be incorporated by copolymerizing small amounts, up to about 20 percent by weight, of α-olefins such as butene, hexene, octene and the like. The frequency and length of the side chains controls the density of the polymer. The low pressure processes are used in the production of products having densities ranging from about 0.91 to about 0.965 gm/cm³. The term linear low density polyethylene (LLDPE) is commonly used, and when used herein is to be understood to mean the low pressure produced copolymers having a density in the range from 0.91 to 0.94 gm/cm³. The term high density polyethylene (HDPE) is commonly used, and is used herein, to describe polyethylene having a density of from about 0.945 to about 0.965 gm/cm³. The polymers in the upper portion of the range are homopolymers of ethylene while those in the lower portion of the range are copolymers containing a small amount of another α-olefin. They generally range in molecular weight from about 100,000 to 500,000 with those in the range from about 100,000 to 300,000 being preferred. These polymers have been found to be useful in the practice of the invention, whereas the use of polyethylene produced at high pressure results in tapes which are weak and which tend to self-bond in the relaxed state. LLDPE is available commercially in grades covering a range of melt flow index, which is a measure of the viscosity under melt flow conditions. Those preferred in the practice of the present invention fall within the range from about 0.2 to about 5 according to ASTM-D-1238.

The polypropylene which can be used in the practice of the present invention is preferably highly crystalline in which propylene is polymerized predominantly in the isotactic configuration. It may also contain a small proportion, up to about 15 percent by weight, of the atactic configuration or of another copolymerized α-olefin such as butene, pentene, hexene, octene and the like. The term polypropylene is used herein to include homopolymers of propylene as well as such copolymers. A large number of grades of polypropylene are available commercially covering a wide range of melt flow index. The grades having a melt flow index according to ASTM-D-1238 of from about 2 to about 12 are preferred.

The relative proportions of thermoplastic polymer and elastomeric polymer used in the practice of the present invention fall within a narrow range. Expressed in parts by weight per 100 parts by weight of total polymer in the compositions, the proportion of high density polyethylene is from about 15 to about 35 parts, preferably from about 15 to about 30 parts. The proportion of linear low density polyethylene is from about 15 to about 30 parts, preferably from about 15 to about 25 parts. The proportion of polypropylene is from about 15 to about 25 parts, preferably from about 15 to about 20 parts. Proportions below the lower limits of the above ranges result in tapes having a level of tack which causes self adhesion of unstretched overlapping layers, whereas proportions higher than the upper limits result in tapes which do not fuse within a reasonable time at normal temperatures when stretched and wrapped in overlapping layers.

Filler or pigment may be included in the flexible layer if desired in an amount up to about 50 parts by weight, based on 100 parts of total polymer. They may be selected from those generally used in rubber compounds, exemplified by carbon black, calcium carbonate, talc, aluminum powder and titanium oxides. The amount of a particular filler or pigment which can be used without adversely affecting the tensile and/or fusion properties of the flexible layer can be readily determined by those skilled in the art. It has been found that carbon black and pigments, when present in the range from 5 to about 20 parts by weight, actually increase the rate of fusion of overlapping layers of stretched wrapped sheets or tapes. Thus when the higher levels of α-olefin polymer are used, it is desirable to include carbon black or pigment in the compositions. To achieve this effect, it is preferred to use a titanium oxide or carbon black. For electrical applications in which conductivity is desired, it is desirable to also use from about 10 to about 30 parts by weight per 100 parts of total polymers of an electrically conducting carbon black or metal powder, such as aluminum powder. For applications where a light colour is cosmetically desirable, it is preferred to use from about 5 to about 40 parts by weight of titanium dioxide per 100 parts of total polymers.

Other optional ingredients may be incorporated into the tape to achieve various performance objectives. For example, there can be added antioxidants and stabilizers, processing aids, lubricants and fire retardants. The use of a separate tackifier is not required.

The tape ingredients are mixed using procedures well known in the art of processing of synthetic rubbers, using either a two roll mill or an internal mixer. When using a two roll mill, the thermoplastic polymer is added to the mill which has been pre-heated to a suitable temperature generally in the range of about 150° C. to about 170° C. and mixed until it fluxes and forms a band on the mill rolls, which usually takes about two minutes. The elastomeric polymer(s), the fatty amide anti-blocking agent and any other additives are then added to the mill and the mixing continued until a uniform blend is obtained, which usually takes a further five minutes. The mixture is taken off the mill as strips of compound. Compound may also be produced in bulk form using an internal mixer by adding the polymers and fatty amide anti-blocking agent in any order to a preheated mixer and mixing until a uniform compound is obtained, usually about five minutes.

The compound is subsequently transformed into sheet form.

Thickness is controlled by the extruder or calender used to prepare the sheets.

Tape thickness is critical to the success of the present invention. While not wishing to be bound by any theories, it is believed that the fatty amide anti-blocking agent exudes to the surface of the tape, and that this exudation is a diffusion-limited phenomenon. Diffusion-limited mass transfer can be described using a theoretical equation in which the distance of diffusion is a critical parameter (theoretical descriptions of diffusion-limited mass transfer are widely available in the open literature).

Thus, it is desirable to have a comparatively thin tape so as to minimize the distance which the fatty amide must diffuse.

The thickness of the tape is also relevant to strength characteristics. That is, tapes of different strength can be prepared from the same ingredients by varying tape thickness. As a lower limit, tapes having an unstretched thickness of less than 0.1 mm are not strong enough for many applications. In general, the strength of the tape can be increased by increasing tape thickness. However, as the tape thickness is increased, so is the difficulty of elongating the tape. Although thick tapes can be readily elongated by machine, such a process is not contemplated for the present tapes. The present invention is directed towards tapes in convenient roll form, and hence the tapes themselves should be manufactured so as to be conveniently elongated and applied by hand. Accordingly, the maximum tape thickness is constrained by the need to provide a tape which is conveniently elongated by hand and, as described above, by the need for the fatty amide blocking agent to be effective. Thus, each layer of tape contained in the tape rolls of the present invention should not have a thickness greater than 2.0 mm.

A highly preferred tape thickness is from 0.3 to 0.8 mm.

The fatty amide anti-blocking agent is essential to the linerless rolls of tape of the present invention. Anti-blocking agents are frequently used in the production of thermoplastic films, in order to reduce the tendency of the films to self-adhere due to static electricity. As used herein, the term "fatty amide anti-blocking agent" is meant to convey its conventional meaning, namely a compound preferably having a long chain hydrocarbon group (i.e., at least 12 carbon atoms) and an amide group. Suitable fatty amides include erucamide, N,N'-ethylene-bis-stearamide, stearamide, arachidamide, oleamide, stearyl erucamide, erucyl erucamide, stearyl stearamide and erucyl stearamide. Preferred examples include erucamide and N,N'-ethylene bis stearamide. The fatty amide is used in an amount sufficient to prevent tape layers in a tension wound roll from fusing to one another, but not in an amount which prevents the tape from fusing after being elongated by at least 50% and spiral wrapped in partially overlapping layers.

Fatty amide anti-blocking agents in an amount between 0.4 and 4 parts per 100 parts of polymer can be employed to produce satisfactory tapes according to the present invention. The optimum amount of fatty amide anti-blocking agent for a particular tape formulation may be quickly established by a person of ordinary skill by following the experimental procedures which are described in the Examples. While not wishing to be bound by theory, it is believed that the optimum amount of anti-blocking agent is dependent upon its molecular weight. Low molecular weight anti-blocking agents are believed to diffuse rapidly to the surface of the tape and can be used in comparatively low concentrations. By way of illustration, it is preferred to use from 0.8 to 3.0 parts of N,N'-ethylene-bis-stearamide per 100 parts of polymer, whereas a fatty amide anti-blocking agent having a lower molecular weight, namely erucamide, is preferably employed in an amount from 0.4 to 2.0 parts by weight.

The diameter of the tension wound tape roll of the present invention is also critical, as will be made evident by the following description of a method to manufacture the tape.

In a preferred manufacturing method, the sheets are first formed into "master rolls" having a width of about 1 to 1.4 meters and a length of up to 180 meters. The master rolls are loosely wound around a core under minimal tension so as to avoid elongating the tape sheet.

A master roll is subsequently used as feed roll for preparing the tension wound rolls of the present invention. The tape is so transferred from the master roll to a second cylindrical core, using conventional tape winding equipment, until the desired diameter of tension-wound tape sheet is obtained around the second cylindrical core.

As the tape sheet is transferred from the master roll, the tension is controlled by controlling the relative rate of rotation between the master roll and the second cylindrical core. A tension wound roll which will not undesirably self-unwind and which will not self fuse can be produced by maintaining appropriate tension on the fatty amide-containing tape sheet.

While not wishing to be bound by any particular theory, it is evident that certain basic principles which are commonly known to skilled mechanical engineers will provide some insight into the control of manufacturing processes to prepare the present tension wound tape rolls.

In particular, a tape roll having a width of about 1 meter might be considered as being analgous to a cylinder (or, as more commonly referred to in engineering mechanics, as a shaft). It is well known that the twisting moment about a shaft is the product of the applied force multiplied by the perpendicular distance from the axis. In many instances, the force is applied at a tangent to the shaft, so the critical distance in determining the twisting moment is the radius of the shaft. Thus, by analogy, the twisting moment caused by a specified, applied force at a tangent to a tape roll will be greater in a tape roll having a large diameter (i.e. in comparison to the moment caused by the same applied force at the tangent of a smaller diameter roll).

Secondly, it is similarly well known that the surface velocity of a rotating shaft is related to the diameter of the shaft. That is, at constant revolutions per minute, the surface velocity of a large diameter shaft is greater than the surface velocity of a small diameter shaft. By analogy, the surface velocity of a tape roll having a large diameter will be higher than the surface velocity of a tape roll having a small diameter.

Theoretical formulae which more precisely describe twisting moments, torsion and surface velocity as they relate to machine shafts are widely available in the literature. The importance of shaft diameter is evident upon examination of these formulae.

While the theoretical formulae may or may not be directly applicable to the preparation of tape rolls according to the present invention, my experimentation has shown that it is not possible, when using conventional tape winding equipment, to produce a satisfactory tension-wound roll of linerless tape having a diameter greater than 12 cm. Futhermore, it is highly preferred to prepare a tension wound, linerless roll of tape having a diameter of less than 10 cm, as such a roll may be more easily prepared within the control capabilities of conventional machinery.

As a final step in the preferred manufacturing process, individual rolls of tape are prepared by slitting the tension wound tape sheets into a desired width. A width of from 1.5 cm to 5 cm is preferred.

The final tape product may be applied to a substrate by subjecting the tape to a stretching elongation in one direction of at least about 50 percent and in the elongated state applying it to the substrate in a spiral-wrapping action. Such stretching results in the tape developing the ability to self-bond and the overlapping layers adhere strongly to each other. These layers have the appearance of a fused sheet on or covering the substrate within a few hours of application. In order to develop the self-bonding properties required, the tape is elongated by at least about 50 percent. The upper limit of elongation depends on the composition of the particular sheet or tape and must be below the level which would cause rupture. Preferably, I have found that an elongation of from about 100 percent to about 300 percent provides an optimum balance between developing self-bonding properties and avoiding rupture.

The tape of my invention may be used in a wide variety of applications such as splicing, encapsulation and connection. Metal parts can be readily covered with the tape for storage or environmental reasons; for example, a metal pylon may be so covered to protect it when immersed in water. Minor repairs may be made to existing covers of exposed parts; for example, underneath cars, trucks or other like vehicles. Damaged boots on tie rod ends or rack and pinion steering components may be readily repaired by covering with a flexible layer in accordance with this invention. The tape may be used in the electrical trade for splicing cables, and for repairing splices and damaged insulation especially in cold weather environments.

The invention is further illustrated by the following Examples, in which all parts and percentages are by weight unless otherwise indicated.

EXAMPLE 1

This example illustrates experiments which were used to examine the effectiveness of various anti-blocking agents.

Polymer mixtures were prepared by mixing the ingredients listed below in conventional, laboratory-scale rubber mixing equipment. The compounds were then converted into tape sheets having an unstretched thickness of about 0.5 mm and a width of 1.9 cm.

The tape sheets were cut into lengths of 250 cm. Tension wound rolls were prepared by wrapping the tape around a cardboard core having a diameter of 1.5 cm, under tension provided by attaching a 100 gram weight to the free end of the tape.

The resulting tension-wound rolls were then subjected to an accelerated ageing test, consisting of placing the rolls in an oven heated to 65° C. (for the length of time shown in the tables).

Rolls which did not self-fuse were unwound by hand, and the "extension" (i.e., the elongation of the tape resulting from the stress of unwinding) was calculated as follows:

$$\text{extension (\%)} = \frac{\text{(unwound length)} - \text{(original length)}}{\text{original length}} \times 100\%$$

Thus, a low extension to unwind result indicates that the roll was easily unwound, without substantially elongating the tape.

In a separate test, the stretched tack of the tape was measured. The tack developed by the tape is dependent upon the extension to which the tape is subjected before being spiral wrapped in overlapping layers and the length of contact time, so both of the percent extension and contact time are reported for the tack results in the following tables. The "tack" figure represents the force required to unwrap overlapping layers, after the stretched and overlapped layers have been contacted for the indicated length of time.

TABLE 1

| Experiment | 1[a] | 2 | 3 | 4 | 5 | 6 | 7 | 8 |
|---|---|---|---|---|---|---|---|---|
| Ingredients (parts by weight) | | | | | | | | |
| Butyl rubber[b] | 75 | 75 | 75 | 75 | 75 | 75 | 75 | 75 |
| LLDPE[c] | 25 | 25 | 25 | 25 | 25 | 25 | 25 | 25 |
| Carbon Black[d] | 10 | 20 | 10 | 20 | 10 | 20 | 10 | 20 |
| Stabilizer[e] | 0.5 | 0.25 | 0.5 | 0.25 | 0.5 | 0.25 | 0.5 | 0.25 |
| Magnesium oxide | 2 | 2 | 2 | 2 | 2 | 2 | 2 | 2 |
| N,N' ethylene-bis stearamide | 0 | 0.8 | 1.0 | 1.2 | 1.4 | 1.6 | 1.8 | 2.0 |
| Properties | | | | | | | | |
| Ageing at 65° C. for 8 days | | | | | | | | |
| Extension to unwind (%) | fused | 1.2 | 1.8 | 0.8 | 0.9 | 0.6 | 0.8 | 0.4 |
| Stretched tack (N/m) (200% extension, 1 hour contact time) | 1260 | 1300 | 1100 | 1050 | 650 | 600 | 500 | 530 |

Notes:
[a] control experiment
[b] sold under trademark POLYSAR ® butyl 301 by Polysar Limited
[c] sold under trademark DOWLEX ® by Dow Chemical
[d] ASTM Designation N330
[e] sold under trademark IRGANOX ® 1010 by Ciba Geigy

TABLE 2

| Experiment | 10 | 11 | 12 | 13 |
|---|---|---|---|---|
| Ingredients (parts by weight) | | | | |
| Butyl rubber[b] | 70 | 70 | 70 | 70 |
| LLDPE[c] | 30 | 30 | 30 | 30 |
| Carbon black[d] | 10 | 15 | 20 | 25 |
| Stabilizer[e] | 1 | 1 | 1 | 1 |
| N,N' ethylene-bis-stearamide | 0.5 | 0.5 | 0.5 | 0.5 |
| Magnesium oxide | 3 | 3 | 3 | 3 |
| Properties | | | | |
| Ageing at 65° C. for 4 Days | | | | |
| Extension to unwind (%) | 0.7 | 1.2 | 0 | 0 |
| Stretched tack (N/m) (200% extension, 1 hour contact time) | 541 | 656 | 756 | 477 |
| (300% extension, 1 hour contact time) | 309 | 526 | 393 | 438 |

Notes:
[b], [c], [d], [e] as per table 1.

TABLE 3

| Experiment | 20 | 22 | 22[a] | 23 |
|---|---|---|---|---|
| Ingredients (parts by weight) | | | | |
| Butyl rubber[b] | 75 | 75 | 75 | 75 |
| LLDPE[c] | 25 | 25 | 25 | 25 |
| Carbon black[d] | 10 | 20 | 0 | 0 |
| Stabilizer[e] | 0.5 | 1.0 | 0.5 | 0.5 |
| N,N' ethylene-bis-stearamide | 2 | 2 | 0 | 1.6 |
| Magnesium oxide | 2 | 2 | 2 | 1.6 |
| Titanium oxide[f] | 0 | 0 | 30 | 30 |
| Properties | | | | |
| Ageing at 65° C. (days) | 8 | 8 | 4 | 4 |
| Extension to unwind (%) | 0.4 | 1.6 | fused | 5 |
| Stretched tack (N/m) (200% extension, 1 hour | 530 | 474 | n.m. | 360 |

TABLE 3-continued

| Experiment | 20 | 22 | 22ᵃ | 23 |
|---|---|---|---|---|
| contact time) | | | | |

Notes:
$a, b, c, d, e$ as per table 1.
$f$ sold under trademark TITANOX ® 2073
n.m. = not measured

TABLE 4

| Experiment | 30$^a$ | 31 |
|---|---|---|
| Ingredients (parts by weight) | | |
| Butyl rubber$^b$ | 70 | 70 |
| LLDPE$^c$ | 30 | 30 |
| Carbon black$^d$ | 10 | 10 |
| Stabilizer$^e$ | 0.5 | 0.5 |
| Erucamide | 0 | 1 |
| Properties | | |
| Ageing at 65° C. for 4 days | | |
| Extension to unwind (%) | 127 | 5 |
| Stretched tack (N/m) | | |
| (200% extension, 1 hour contact time) | 561 | 238 |

Notes
$a, b, c, d, e$ as per table 1.

TABLE 5

| Experiment | 40$^a$ | 41 | 42 |
|---|---|---|---|
| Ingredients (parts by weight) | | | |
| Butyl rubber$^b$ | 70 | 70 | 70 |
| LLDPE$^c$ | 30 | 30 | 30 |
| Carbon black$^d$ | 5 | 5 | 5 |
| Stabilizer$^e$ | 1.0 | 1.0 | 1.0 |
| Erucamide | 0 | 0.75 | 0.5 |
| Properties | | | |
| Ageing at 65° C. for 1 day | | | |
| Extension to unwind (%) | 283 | 4.2 | 24 |
| Stretched tack (N/m) | | | |
| (300% extension, 1 hour contact time) | 410 | 224 | 246 |

Notes
$a, b, c, d, e$ as per table 1.

TABLE 6

| Experiment | 50 | 51$^a$ | 52 | 53 |
|---|---|---|---|---|
| Ingredients (parts by weight) | | | | |
| Butyl rubber$^b$ | 70 | 70 | 70 | 70 |
| LLDPE$^c$ | 30 | 30 | 30 | 30 |
| Carbon black$^d$ | 10 | 10 | 10 | 10 |
| Stabilizer$^e$ | 1.0 | 1.0 | 1.0 | 1.0 |
| N,N' ethylene-bis-stearamide | 0 | 0.25 | 0.5 | 0.75 |
| Erucamide | 1.0 | 0 | 0 | 0 |
| Magnesium oxide | 5 | 3 | 3 | 3 |
| Calcium stearate | 0.5 | 0 | 0 | 0 |
| Properties | | | | |
| Ageing at 65° C. for 4 days | | | | |
| Extension to unwind (%) | 1.7 | fused | 0.7 | 0 |
| Stretched tack (n/m) | | | | |
| (200% extension, 1 hour contact time) | 217 | — | 309 | 323 |

Notes
$a, b, c, d, e$ as per table 1.

EXAMPLE 2

This example relates to the production of linerless tape according to the present invention using conventional manufacturing equipment.

The ingredients listed in Table 8 were thoroughly mixed in a banbury mixer, and the resulting compound was discharged from the mixer and sheeted having dimensions between 3 mm and 9 mm.

Compound sheets were subsequently added to a calender and formed into sheets having a thickness of about 0.48 mm and a width of about 1.2 meters.

The sheets were then rolled, without tension, around hollow cylindrical cores to form "master" rolls having a length of about 45 meters.

Tension wound rolls were then prepared using a "rewind" machine by transferring tape sheet from the master roll to a second cylindrical core having an outside diameter of about 4.4 cm.

The rewind machine was not equipped with an instrument to measure the tension on the tape. However, the machine did have an adjustable tension control on its turret, thus allowing a skilled operator to qualitatively control the tension.

Tape was transferred from the master roll to the second core until the diameter of the second roll was approximately 7 cm (thus providing a tape length of about 5 meters around the second core).

The tension wound tape was then transferred to a slitting machine and slit into tape rolls having a width of about 2.5 cm.

Physical properties of the tension wound tape are shown in table 8. It is particularly significant that the tape could be easily unwound after ageing the roll for 8 days at 65° C.

The tensile properties of the tape (100% modulus or "$M_{100}$", 300% modulus or "$M_{300}$", tensile strength at break or "$T_b$" and elongation at break or "$E_b$") were measured according to ASTM D 412.

TABLE 8

| Ingredients (parts by weight) | |
|---|---|
| Butyl rubber$^b$ | 68 |
| EPDM$^k$ | 5 |
| LLDPE$^c$ | 27 |
| Zinc stearate | 0.4 |
| Stabilizer$^e$ | 1.0 |
| Titanium oxide$^f$ | 30 |
| N—N' ethylene-bis-stearamide | 3 |
| Magnesium oxide | 2 |
| Properties | |
| Stretched tack (N/m) | 505 |
| (200% Extension, 1 hour) | |
| Tensile Properties | |
| $M_{100}$ | 2.0 MPa |
| $M_{300}$ | 2.5 MPa |
| $T_b$ | 3.7 MPa |
| $E_b$ | 930% |
| Ageing at 65° C. for 8 days | |
| Extension to roll unwind (%) | <5 |

Notes:
$b, c, e$ as per table 1.
$f$ as per table 3.
$k$ = sold under tradename POLYSAR ® EPDM 585 by Polysar Limited.

What is claimed is:

1. A tension-wound, linerless roll of tape, said tape having an unstretched thickness of from 0.1 to 2.0 mm and having insufficient tack to self-bond in the relaxed state and being capable of fusing into a homogeneous mass when elongated by at least about 50 percent and wrapped into overlapping layers wherein said tape comprises (I) a polymer mixture selected from the group consisting of (all parts being parts by weight) (a) a mixture of from about 15 to about 30 parts of a polymer of ethylene having a density of from about 0.945 to about 0.965 grams/cm³ with from about 70 to about 85 parts of elastomeric polymer, (b) a mixture of from about 15 to about 30 parts of a linear low density polymer of ethylene having a density of from about 0.91 to about 0.94 grams/cm$^3$ with from about 70 to about 85 parts of elastomeric polymer, and (c) a mixture of from about 15 to about 25 parts of isotactic polypropylene with from about 75 to about 85 parts of elastomeric polymer, said elastomeric polymer consisting of from about 50 to 100 parts by weight of an isobutylene-isoprene polymer and from 0 to about 50 parts by weight of one or more polymers selected from (i) natural rubber, (ii) a homopolymer of isobutylene having a molecular weight from about 50,000 to about 100,000, and (iii) a polymer of ethylene and propylene containing from about 50 to about 65 percent by weight ethylene, and (II) from 0.4 to 4 parts (per 100 parts of said polymer mixture) of fatty amide anti-blocking agent, said roll of tape having a diameter of less than 12 cm.

2. The roll of claim 1 wherein said fatty amide anti-blocking agent consists of from 2 to 3 parts by weight of N-N'ethylene-bis-stearamide per 100 parts by weight of said polymer mixture.

3. The roll of claim 1 having a diameter of less than 10 cm.

4. The roll of claim 1 wherein said tape is characterized by having an unstretched thickness of from 0.3 to 0.8 mm.

5. The roll of claim 1 wherein said isobutylene-isoprene polymer is selected from (a) a copolymer containing from about 97 to about 99.5 weight percent of isobutylene and from about 0.5 to about 3 weight percent of isoprene and (b) a copolymer containing from about 95 to about 99 weight percent of isobutylene, from about 0.5 to about 2 weight percent of isoprene and from about 0.5 to about 1.5 weight percent of chlorine or from about 1 to about 3 weight percent of bromine.

6. The roll of claim 5 wherein said isobutylene-isoprene polymer has a Mooney viscosity (ML 1+8 at 100° C.) of from about 30 to about 80.

7. The roll of claim 1 wherein said polymer of ethylene and propylene is a copolymer of ethylene, propylene and ethylidene norbornene.

8. The roll of claim 1 wherein said mixture further contains from 5 to 40 parts by weight of titanium dioxide per 100 parts combined weight of said polymer mixture.

9. The roll of claim 1 wherein said mixture further contains from 5 to 20 parts by weight of carbon black per 100 parts combined weight of said polymer mixture.

* * * * *